United States Patent
Rudrapatna et al.

(10) Patent No.: US 8,520,539 B2
(45) Date of Patent: Aug. 27, 2013

(54) PERMUTATION ZONE FOR COORDINATED MULTI-POINT SYSTEMS

(75) Inventors: Ashok N. Rudrapatna, Basking Ridge, NJ (US); Kathiravetpillai Sivanesan, Richardson, TX (US)

(73) Assignee: Alcatel Lucent, Paris (FR)

(*) Notice: Subject to any disclaimer, the term of this patent is extended or adjusted under 35 U.S.C. 154(b) by 475 days.

(21) Appl. No.: 12/826,817

(22) Filed: Jun. 30, 2010

(65) Prior Publication Data

US 2011/0026483 A1 Feb. 3, 2011

Related U.S. Application Data

(60) Provisional application No. 61/273,180, filed on Jul. 31, 2009.

(51) Int. Cl.
*H04L 12/56* (2006.01)
(52) U.S. Cl.
USPC .................. 370/252; 370/329; 370/419
(58) Field of Classification Search
USPC ............... 370/252, 328, 329, 419; 379/88.17
See application file for complete search history.

(56) References Cited

U.S. PATENT DOCUMENTS

| 7,873,023 | B2* | 1/2011 | Ihm et al. ........................ 370/349 |
| 2006/0271341 | A1* | 11/2006 | Brown et al. ........................ 703/1 |
| 2007/0274253 | A1* | 11/2007 | Zhang et al. .................. 370/328 |
| 2008/0165881 | A1* | 7/2008 | Tao et al. ........................ 375/267 |
| 2008/0176577 | A1* | 7/2008 | Bourlas et al. ................. 455/454 |
| 2011/0014909 | A1* | 1/2011 | Han et al. ...................... 455/423 |
| 2011/0249644 | A1* | 10/2011 | Boariu et al. .................. 370/329 |

FOREIGN PATENT DOCUMENTS

| EP | 1 885 142 A1 | 6/2008 |
| WO | WO 2009/073744 | 11/2009 |

OTHER PUBLICATIONS

PCT Search Report PCT/US2010/042090 dated Jul. 12, 2010.
Written Opinion.
IEEE 802 16 Broadband Wireless Access Working Group: "Management of Radio Resources Assigned to Neighboring BSs", IEEE C 802.16G-06/052R1, Sep. 26, 2006), XP002418167 p. 1/13-p. 13/13.

* cited by examiner

*Primary Examiner* — John Pezzlo
(74) *Attorney, Agent, or Firm* — Williams, Morgan & Amerson (57) ABSTRACT

The present subject matter provides a method for implementation in a wireless communication system that includes a plurality of base stations for providing wireless connectivity to at least a first mobile unit. A first signal processed using a first permutation mapping is communicated between the first mobile unit and a first base station. A second signal processed using the first permutation mapping is communicated between the first mobile unit and a second base station different than the first base station. The first and second signals are processed based on the first permutation mapping to extract data therefrom.

24 Claims, 8 Drawing Sheets

PERMUTATION ZONE FOR COORDINATED MULTI-POINT SYSTEMS

CROSS-REFERENCE TO RELATED APPLICATIONS

This application claims the benefit of the filing date of U.S. Provisional Application Ser. No. 61/273,180 filed Jul. 31, 2009, entitled "Method for Interference Management with Multipoint Transmission".

BACKGROUND OF THE INVENTION

This invention relates generally to communication systems, and, more particularly, to a permutation zone for coordinated multi-point systems.

Base stations in wireless communication systems provide wireless connectivity to users within a geographic area, or cell, associated with the base station. In some cases, the cell may be divided into sectors that subtend a selected opening angle (e.g., three 120° sectors or six 60° sectors) and are served by different antennas. The wireless communication links between the base station and each of the users typically includes one or more downlink (DL) (or forward link) channels for transmitting information from the base station to the mobile unit and one or more uplink (UL) (or reverse link) channels for transmitting information from the mobile unit to the base station. The uplink and/or downlink channels include traffic channels, signaling channels, broadcast channels, paging channels, pilot channels, and the like. The channels can be defined according to various protocols including time division multiple access (TDMA), frequency division multiple access (FDMA), code division multiple access (CDMA), orthogonal frequency division multiple access (OFDMA), as well as combinations of these techniques. The geographical extent of each cell may be time variable and may be determined by the transmission powers used by the base stations, access point, and/or mobile units, as well as by environmental conditions, physical obstructions, and the like.

Mobile units are assigned to base stations based upon properties of the channels supported by the corresponding air interface. For example, in a traditional cellular system, each mobile unit is assigned to a cell on the basis of criteria such as the uplink and/or downlink signal strength. The mobile unit then communicates with that serving cell over the appropriate uplink and/or downlink channels. Signals transmitted between the mobile unit and the serving cell may interfere with communications associated with other mobile units and/or cells. For example, mobile units and/or base stations create intercell interference for all other sites that use the same time/frequency resources. The increasing demand for wireless communication resources has pushed service providers towards implementing universal resource reuse, which increases the likelihood of intercell interference. In fact, the performance of modern systems is primarily limited by inter-cell interference, which dominates the underlying thermal noise.

Intercell interference can be reduced in several ways, for example through frequency planning, soft handoff, or beamforming multiple antennas. For example, most mobile systems employ sector specific frequency and/or temporal permutation, hopping, or scrambling in the down link (DL). This is generally beneficial to aid in inter-sector interference averaging especially in frequency reuse one systems, e.g., OFDMA and CDMA systems.

A new type of system architecture, referred to as Coordinated Multi-Point (CoMP), has been proposed where multiple base stations may concurrently communicate with a single mobile station to improve performance. Exemplary preliminary standards for such approaches are LTE-Adv (Rel. 10) and IEEE 802.16m. A limitation of current techniques for reducing inter-cell interference is that such techniques are specifically designed to prevent a mobile station from recognizing signals from other cells.

SUMMARY OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for implementation in a wireless communication system that includes a plurality of base stations for providing wireless connectivity to at least a first mobile unit. A first signal processed using a first permutation mapping is communicated between the first mobile unit and a first base station. A second signal processed using the first permutation mapping is communicated between the first mobile unit and a second base station different than the first base station. The first and second signals are processed on the first permutation mapping to extract data therefrom.

In another embodiment a mobile unit operable to communicate a first signal with a first base station and a second signal with a second base station includes a scheduler operable to apply a multi-point permutation mapping for processing the first and second signals. The first and second signals are processed to extract data therefrom.

In yet another embodiment, a wireless communication system includes at least a first mobile unit, a first base station operable to communicate a first signal with the first mobile unit, a second base station operable to communicate a second signal with the first mobile unit, and a controller operable to communicate a first permutation mapping to the mobile unit and the first and second base stations. The first and second signals are processed using the first permutation mapping to extract data therefrom.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
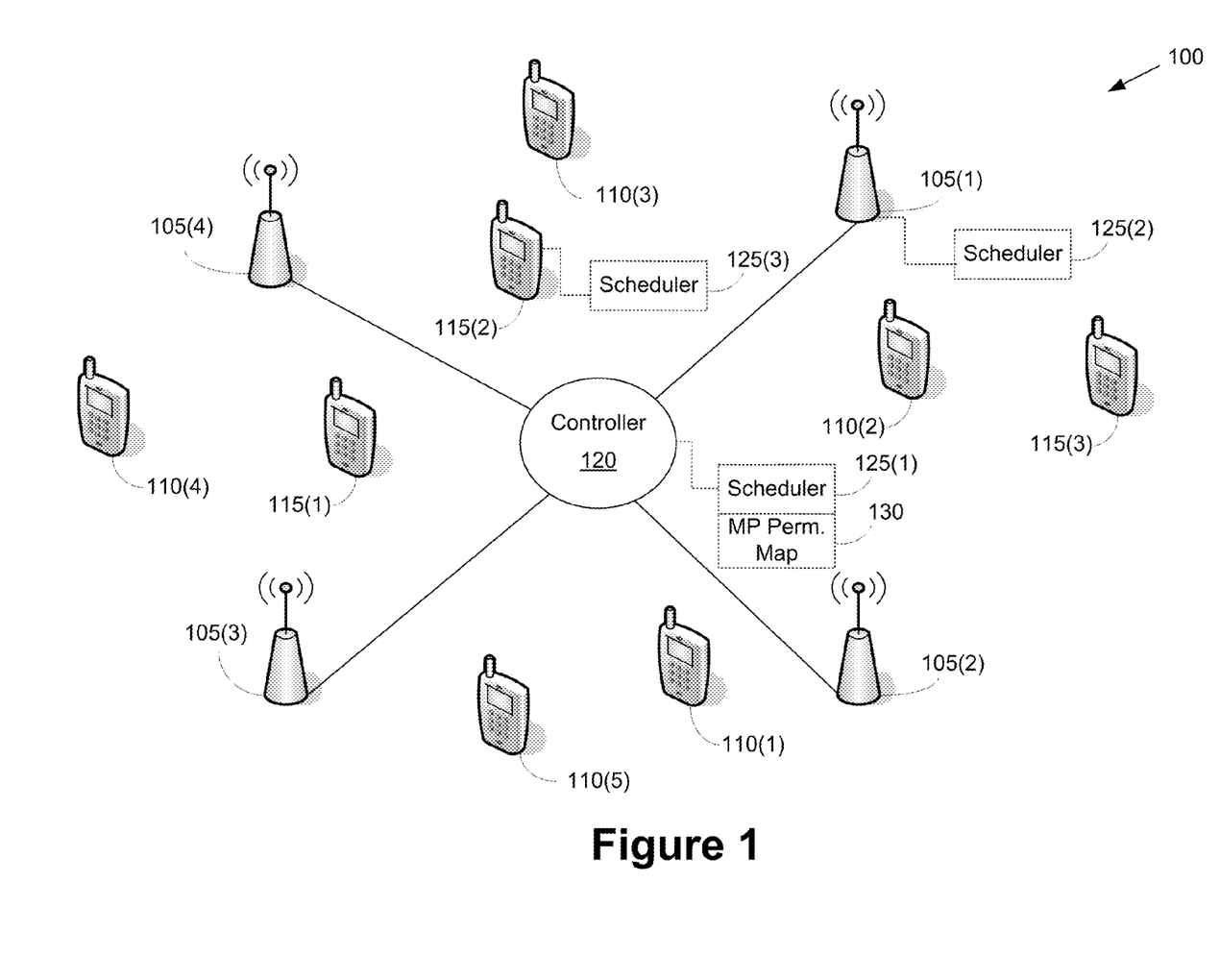
FIG. 1 conceptually illustrates a first exemplary embodiment of a wireless communication system.

FIG. 1 conceptually illustrates a first exemplary embodiment of a wireless communication system 100. In the illustrated embodiment, the wireless communication system 100 is operable to support legacy stations using conventional communication approaches known in the art as well as advanced devices employing multi-point (i.e., CoMP) approaches. The term legacy as used herein generally refers to a mobile unit that does not support a multi-point approach. The example embodiments and references to particular standards and formats shown and described herein are meant to be illustrative only and are not intended to be limiting in any way. As such, various modifications will be apparent to those skilled in the art for application to other wireless communication systems and are contemplated by the teachings herein.

The wireless communication system 100 includes a plurality of base stations 105(1-4). The distinguishing indices (1-4) may be used to indicate individual base stations 105(1) or subsets of the base stations 105(1-2). However, these indices may be dropped when referring to the base stations 105 collectively. This convention may be applied to other elements depicted in the figures and referred to using a numeral and one or more distinguishing indices. The base stations 105 are configured to provide wireless connectivity, which includes transmitting signals over an air interface, receiving signals over the air interface, and performing measurements related to communication over the air interface. Techniques for transmitting, receiving, and measuring are known in the art and in the interest of clarity only those aspects of these techniques that are relevant to the present subject matter will be discussed herein. Persons of ordinary skill in the art having benefit of the present disclosure will appreciate that the present subject matter is not limited to a wireless communication system 100 including any particular number of base stations 105. Furthermore, persons of ordinary skill in the art having benefit of the present disclosure will appreciate that alternative embodiments of the wireless communication system 100 may include other functional entities for providing wireless connectivity including, but not limited to, access points, base station routers, node-Bs, and the like.

One or more mobile units 110, 115 can access the wireless communication system 100 by establishing one or more wireless communication links (or legs) to one or more of the base stations 105. Techniques for establishing, maintaining, communicating over, and/or tearing down the wireless communication links are known in the art and in the interest of clarity only those aspects of these techniques that are relevant to the present invention will be discussed herein. Persons of ordinary skill in the art having benefit of the present disclosure should appreciate that the wireless communication system 100 is not limited to any particular number of mobile units 110. Persons of ordinary skill in the art having benefit of the present disclosure should also appreciate that the mobile units 110 may also be referred to as mobile stations, subscriber stations, subscriber terminals, user equipment, and the like.

In the illustrated embodiment, the mobile units 110 represent legacy mobile units that establish and maintain communications with a single base station 105, while the mobile units 115 represent multi-point mobile units 115 that are capable of receiving concurrent signals from multiple base stations 105. A central controller 120 is provided to coordinate the communication resources of the base stations 105. When a multi-point mobile unit 115 associates with a base station 105 it notifies the base station 105 that it is capable of simultaneous communication with multiple base stations 105 (i.e., capable of multi-point operation) and indicates based on observed signal parameters which other base stations 105 may be reached. The base station 105 that first associates with the multi-point mobile unit 115 informs the controller 120 of this capability. The controller 120 tracks the multi-point mobile units 115 in the system 100 and those base stations 105 that may serve each multi-point mobile unit 115.

The controller 120 manages the flow of data between the multi-point mobile units 115 and the various base stations 105. The multi-point mobile unit 115 completes an association process with each base station 105 with which it wishes to communicate. For example, the multi-point mobile unit 115(1) may associate with the base stations 105(3), 105(4), and the multi-point mobile unit 115(2) may associate with the base stations 105(1), 105(3), and 105(4). The controller 120 implements a scheduler 125(1) that coordinates with a scheduler 125(2) for each base station 105 and a scheduler 125(3) for each mobile unit 115. The controller 120 promulgates a multi-point permutation map 130 for coordinating the communications between the multi-point mobile units 115 and their respective base stations 105. With respect to the legacy mobile units 110, a single base station 105 is associated with each mobile unit 110 and schedule coordination is controlled by the base station 105.

Although the following illustration is generally described in reference to a CoMP implementation, it is also contemplated that other communication topologies may be used. For example, a multi-streaming approach may be used where a mobile unit communicates with a plurality of base stations in a non-coordinated fashion. In such an implementation, a shared permutation mapping would also be employed.

Figure 2:
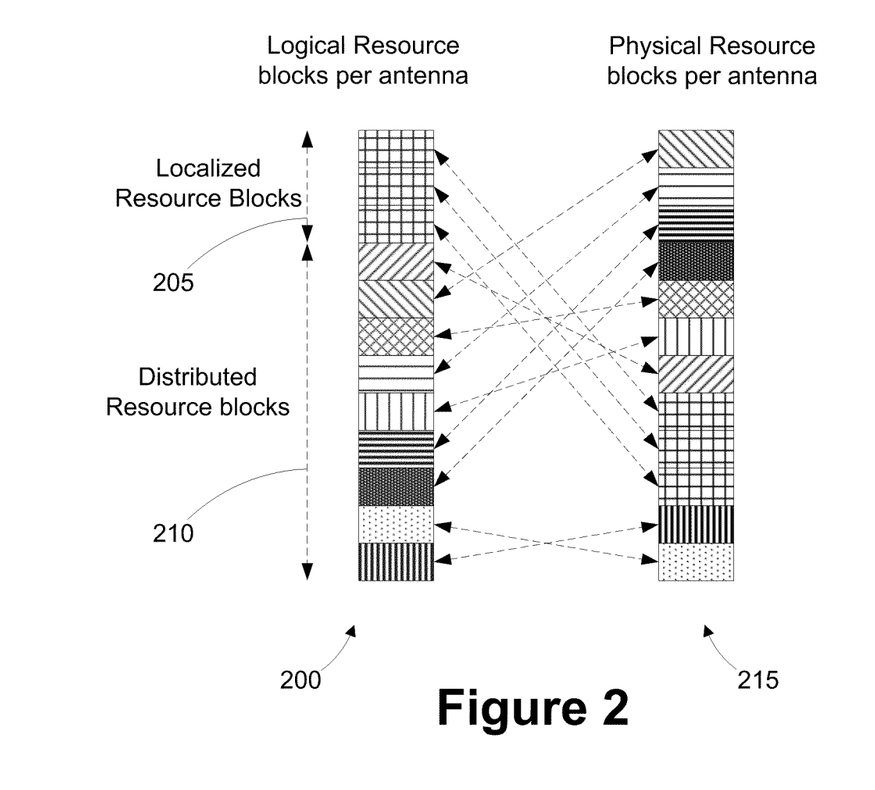
FIGS. 2 and 3 illustrate exemplary permutation mapping techniques.
Figure 3:
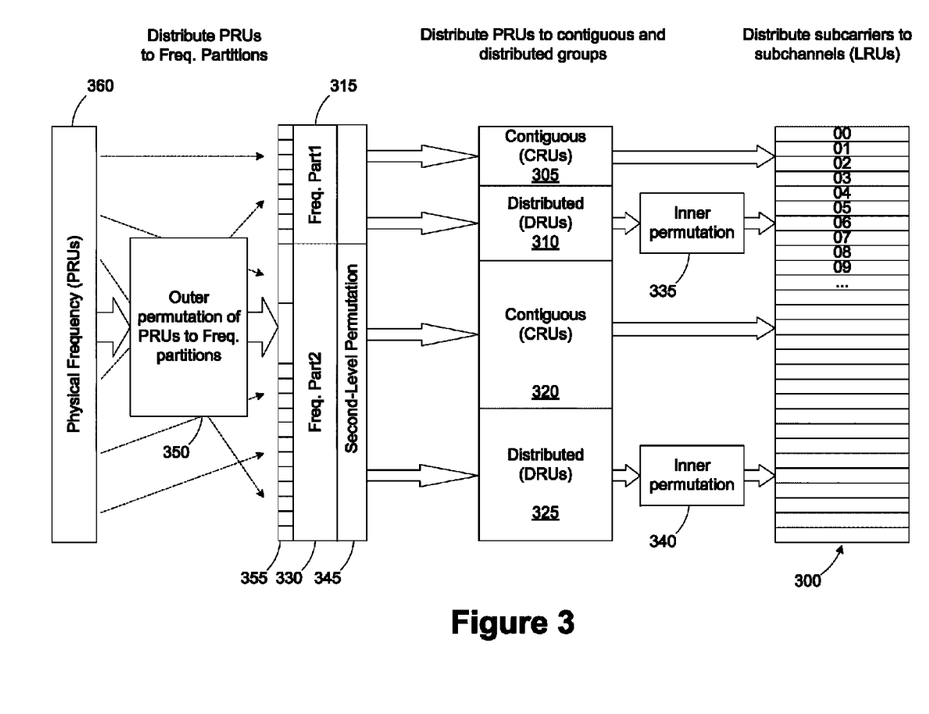

A common form of mapping permutation to reduce inter-cell interferences is to allocate logical resource blocks that represent the data to be sent on the channel (i.e., uplink or downlink) to physical resource blocks that represent the transmission signals sent over the antennas in a non-contiguous fashion. FIG. 2 illustrates an exemplary resource mapping that may be conducted by a resource element mapper in an LTE implementation, and FIG. 3 illustrates an exemplary resource mapping that may be conducted by a resource element mapper in an IEEE 802.16m implementation. The permutation mappings illustrated in FIGS. 2 and 3 are exemplary in nature. The present subject matter is not limited to any particular mapping technique.

Referring to FIG. 2, logical resource blocks 200 for a particular antenna are segregated into localized resource blocks 205 and distributed resource blocks 210. In general, localized resource blocks 205 are allocated to mobile units 110, 115 that are essentially stationary, while distributed resource blocks 210 are allocated to transitory mobile units 110, 115. To implement the mapping permutation, the logical resource blocks 200 are distributed amongst available physical resource blocks 215 using a generally non-contiguous mapping. In the illustrated embodiment, a physical resource block 215 represents a 1 ms time interval and a set of 12 sub-carriers. Of course, the particular construct of a physical resource block 215 may vary depending on the particular governing standard employed. The localized resource blocks 205 are scheduled together as a contiguous group, but the distributed resource blocks 210 are not. Mapping the distributed resource blocks 210 in a non-contiguous manner generally provides additional frequency diversity to improve performance for a moving mobile unit 110, 115.

The implementation of FIG. 3 includes a plurality of levels of mapping permutation. Logical resource blocks 300 are divided amongst a plurality of frequency partitions. For example, different carriers may have access to different frequency partitions. Contiguous resource blocks 305 and distributed resource blocks 310 are associated with a first frequency partition 315, and contiguous resource blocks 320 and distributed resource blocks 325 are associated with a second frequency partition 330. The logical resource blocks 200 are subjected to inner permutations 335, 340, respectively, to generate the distributed resource blocks 310, 325. A second-level permutation 345 is present between the frequency partitions 315, 320 and the groups 305-325. An outer permutation 350 is provided between the sub-carriers 255 and physical frequency resource blocks 360.

In conventional, single-point association implementations, each base station 105 maintains its own permutation mapping and applies it to mobile units 110 it controls. In accordance with the present subject matter, each base station 105 uses a common permutation mapping for at least the resource blocks allocated for multi-point mobile units 115.

Figure 4:
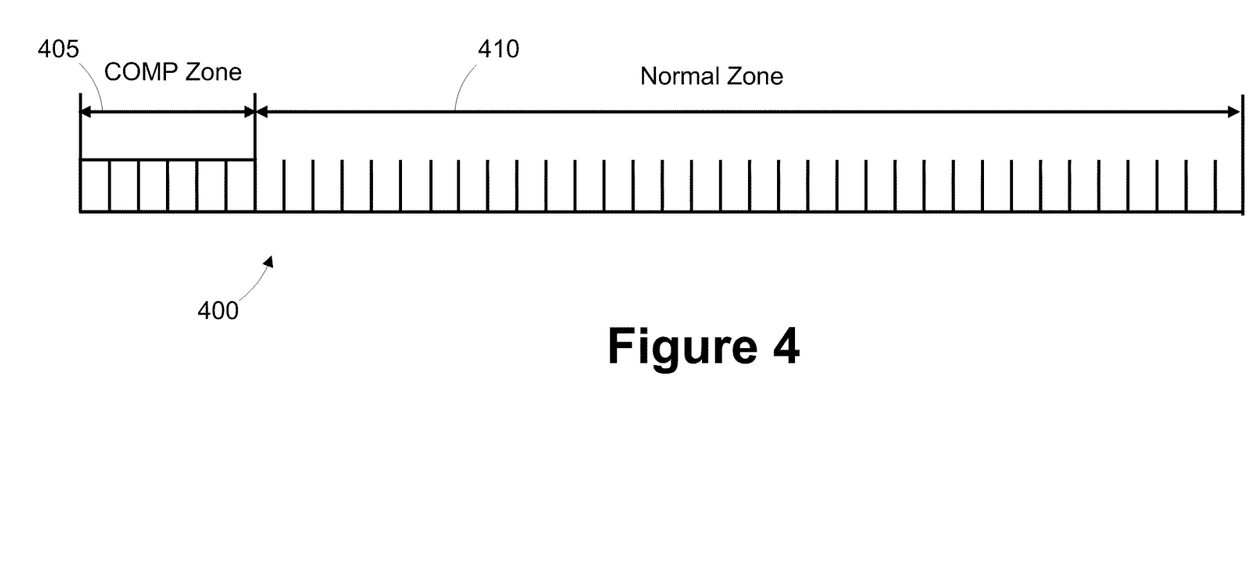
FIG. 4 is a diagram illustrating the creation of permutation zones by allocating resource blocks.

FIG. 4 illustrates an exemplary resource block mapping. A subset of the logical resource blocks 400 may be allocated specifically to multi-point mobile units 115, thus creating a multi-point zone 405, and a normal zone 410 consisting of the remaining logical resource blocks 400. In operation, each base station 105 communicating with a particular multi-point mobile unit 115 would use the same mapping between logical and physical resource blocks for at least the multi-point mobile unit 115. This could include mapping the logical resource blocks 400 in the multi-point zone 405 through multiple levels of permutation, as illustrated in FIG. 3. The mapping of the logical resource blocks 400 to physical resource blocks for logical resource blocks 400 in the normal zone 410 could be managed by the individual base station 105. The controller 120 (see FIG. 1) communicates the multi-point permutation map 130 for the multi-point zone 405 to the associated base stations 105 and multi-point mobile units 115. Different multi-point permutation maps 130 could be used for different subsets of coordinating base stations 105 as long as the multi-point permutation map 130 for any one multi-point mobile unit 115 is the same for each of the base stations 105 with which it is associated.

In other embodiments, the permutations used for multi-point mobile units 115 may be managed based time and/or frequency division. Separate "zones" for legacy mobile units 110 and multi-point mobile units 115 may be defined based on these divisions.

Figure 5:
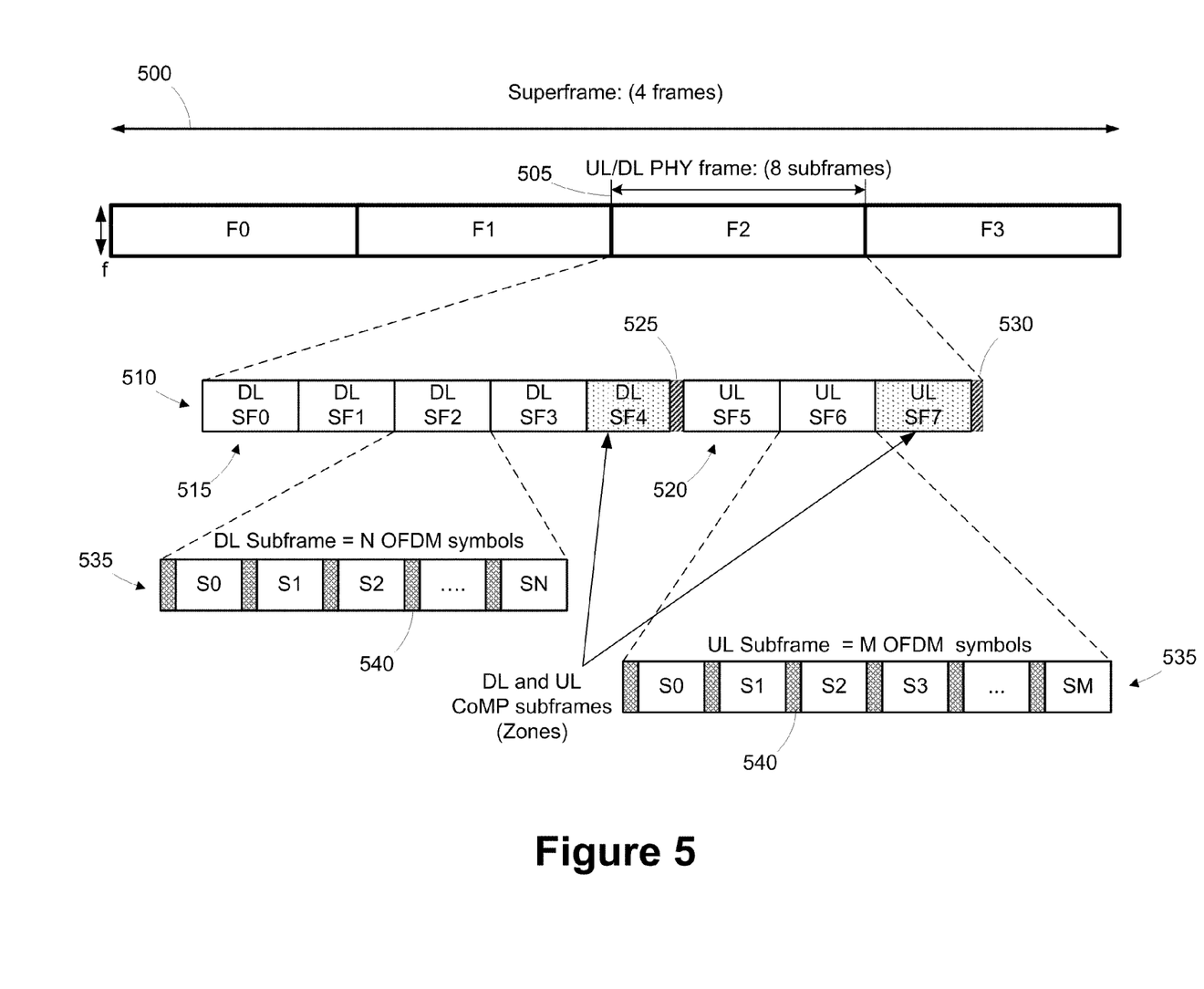
FIG. 5 is a diagram illustrating the creation of permutation zones using time division duplexing under an IEEE 802.16m frame structure.

FIG. 5 illustrates an exemplary time division multiplexing approach in accordance with an illustrative IEEE 802.16m time division duplexing (TDD) frame structure. A superframe 500 includes four frames 505, each having eight subframes 510. The subframes 510 are grouped into downlink subframes 515 and uplink subframes 520 with a transmit transition gap (TTG) 525 and a receive transition gap (TTG) 530 defined between downlink/uplink transitions. Each downlink subframe 515 includes N orthogonal frequency-division multiplexing (OFDM) symbols 535, and each uplink subframe 520 includes M orthogonal OFDM symbols 535. Cyclic prefix intervals 540 occur between adjacent symbols 535. In accordance with this embodiment, separate multi-point and legacy zones are created by assigning at least one downlink subframe 515 (e.g., SF4) and at least one uplink subframe 520 (e.g., SF7) for multi-point communication. During the multi-point subframes SF4, SF7, the same permutation is applied by each base station 105 for the multi-point mobile units 115 in accordance with the shared multi-point permutation map 130. During the remaining subframes 510, each base station 105 may control the mapping.

Figure 6:
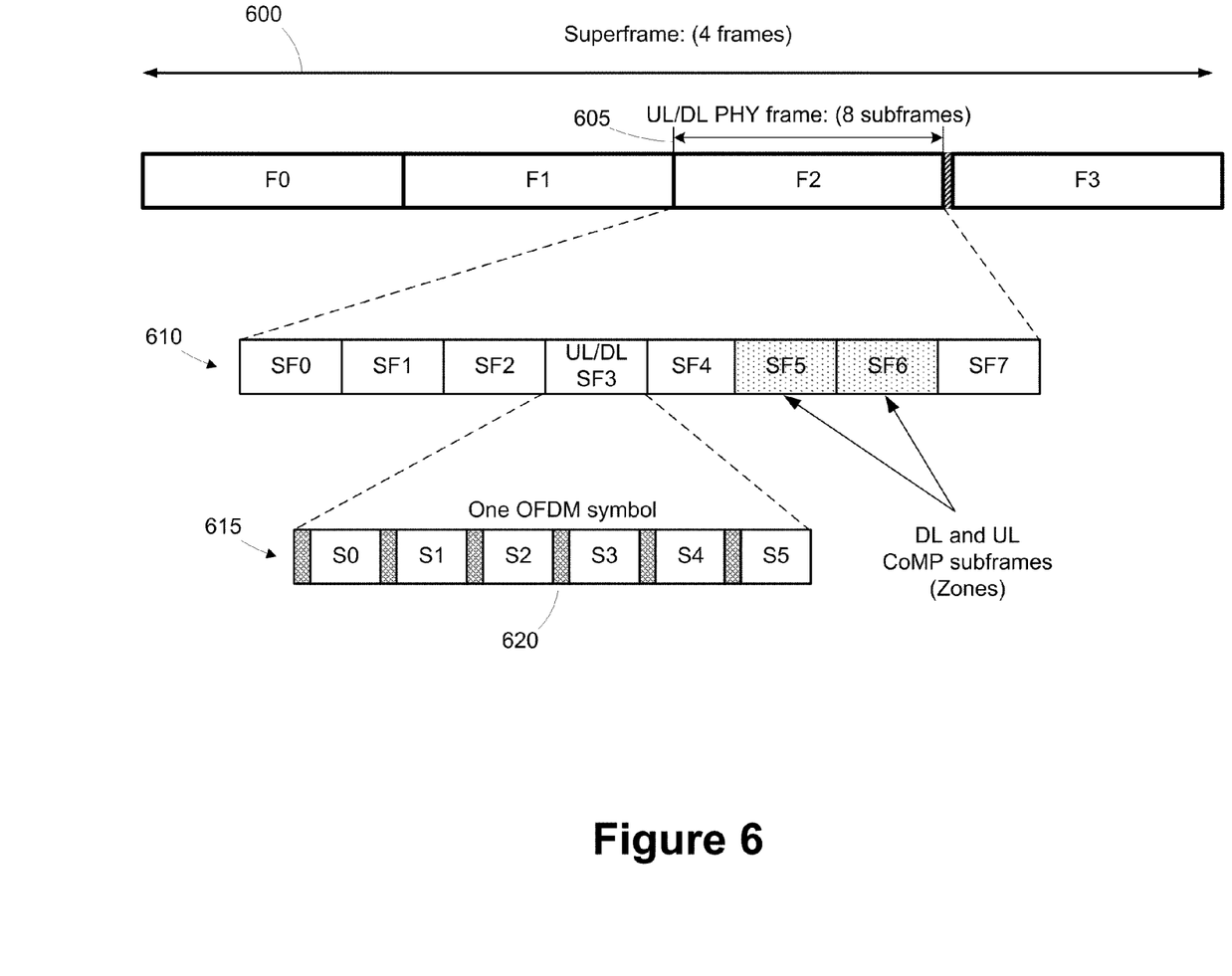
FIG. 6 is a diagram illustrating the creation of permutation zones using frequency division duplexing under an IEEE 802.16m frame structure.

FIG. 6 illustrates an exemplary time division multiplexing (TDM) approach in accordance with an illustrative IEEE 802.16m frequency division duplexing (FDD) frame structure. A superframe 600 includes four frames 605, each having eight subframes 610. Each subframe 610 includes a plurality of orthogonal frequency-division multiplexing (OFDM) symbols 615 (e.g., six in FIG. 6). Cyclic prefix intervals 620 occur between adjacent symbols 615. In accordance with this embodiment, separate multi-point and legacy zones are created by assigning at least one subframe 610 (e.g., SF5 and SF6) for multi-point communication. During the multi-point subframes SF5, SF6, the same permutation is applied by each base station 105 for the multi-point mobile units 115 in accordance with the shared multi-point permutation map 130. During the remaining subframes 610, each base station 105 may control the mapping.

Figure 7:
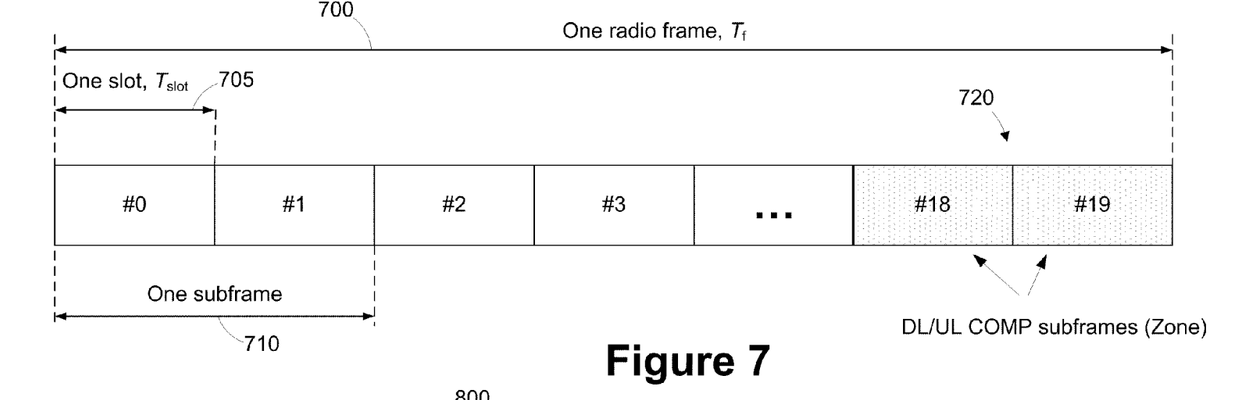
FIGS. 7 and 8 are diagrams illustrating the creation of permutation zones using time division duplexing under an LTE frame structure.

FIG. 7 illustrates an exemplary time division multiplexing (TDM) approach in accordance with an illustrative LTE frequency division duplexing (FDD) Type 1 frame structure. A radio frame 700 includes twenty slots 705. Each grouping of two slots 705 defines a subframe 710. In accordance with this embodiment, separate multi-point and legacy zones are created by assigning a subset of the subframes 710 (e.g., time slots 18 and 19) for multi-point communication. During the multi-point subframe 720, the same permutation is applied by each base station 105 for the multi-point mobile units 115 in accordance with the shared multi-point permutation map 130. During the remaining subframes 710, each base station 105 may control the mapping.

Figure 8:
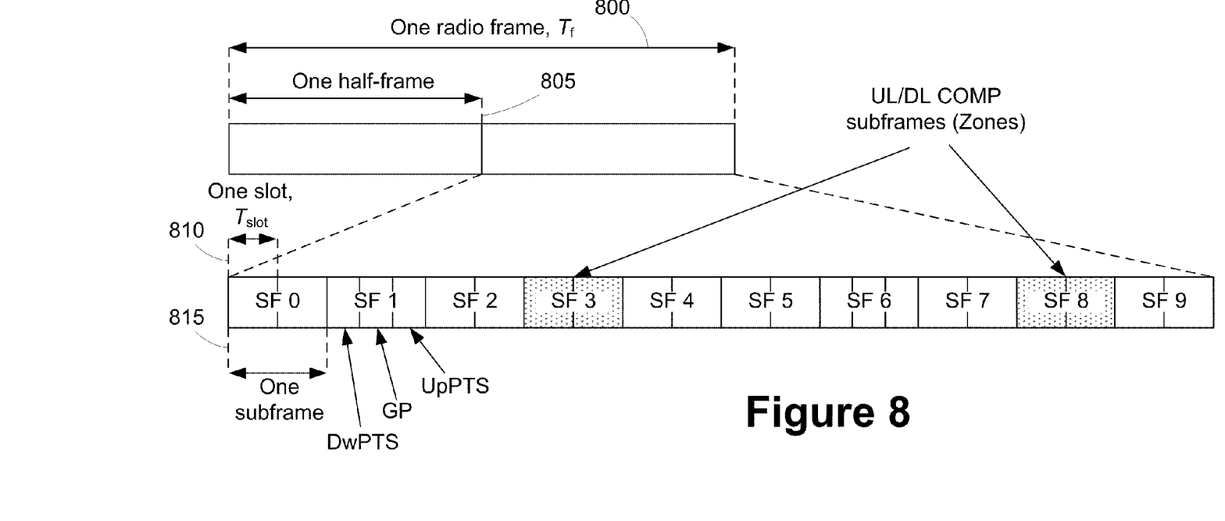

FIG. 8 illustrates an exemplary time division multiplexing (TDM) approach in accordance with an illustrative LTE frequency division duplexing (FDD) Type 2 frame structure. A radio frame 800 is subdivided into half-frames 805, each having ten slots 810. Each grouping of two slots 810 defines a subframe 815. Certain subframes (e.g., SF1 and SF6) are allocated for synchronization and include a downlink pilot timeslot (DwPTS), an uplink pilot timeslot (UpPTS), and an intervening guard period (GP). In the illustrated embodiment, SF2-5 are uplink subframes, and SF7-9 and SF1 are downlink subframes. In accordance with this embodiment, separate multi-point and legacy zones are created by assigning a subset of the subframes 815 (e.g., SF3 and SF8) for multi-point communication. During the multi-point subframe, the same permutation is applied by each base station 105 for the multi-point mobile units 115 in accordance with the shared multi-point permutation map 130. During the remaining subframes 815, each base station may control the mapping.

Figure 9:
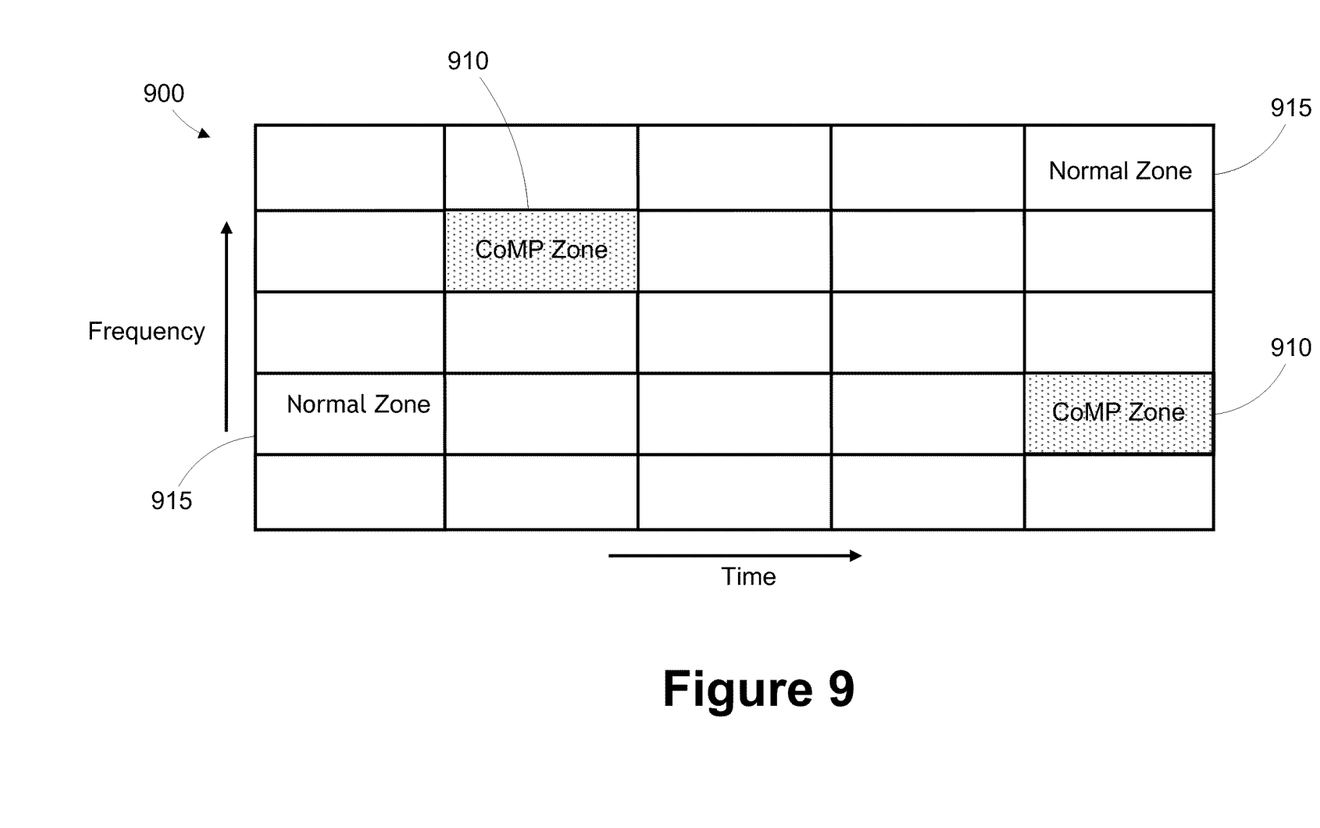
FIG. 9 is a diagram illustrating the creation of permutation zones using time and frequency division duplexing.

FIG. 9 shows a simplified diagram to illustrate a technique that includes both time division multiplexing (TDM) and frequency division multiplexing (FDM). Different time/frequency blocks 900 are illustrated. A frequency block may include one or more subcarriers. To separate multi-point and legacy zones, selected time/frequency blocks 905 are allocated for multi-point communication. The remaining time/frequency blocks 910 are allocated for the normal zone. At the designated times and at the designated frequencies for the multi-point blocks 905, the same permutation is applied by each base station 105 for the multi-point mobile units 115 in accordance with the shared multi-point permutation map 130. During the remaining time/frequency blocks 905, each base station 105 may control the mapping.

During multi-point zone communication, the coordinated signals from the base stations 105 to the multi-point mobile units 115 increases the performance of the connection therebetween. In some cases, all of the base stations in the multi-point group may send the same data at the same time to a particular multi-point mobile unit 115, allowing the multi-point mobile unit 115 to receive and process the combined signal to realize diversity gain. In other embodiments, the base stations 105 may collaboratively transmit different signals. The multi-point mobile unit 115 may receive the signals over a plurality of symbol periods and then process them intelligently to separate the transmitted signals (e.g., using an Alamouti scheme). Hence, the performance gains may be evidenced by increased signal quality and/or increased data throughput.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method for implementation in a wireless communication system that includes a plurality of base stations for providing wireless connectivity to at least a first mobile unit, comprising:

communicating between the first mobile unit and a first base station a first signal using at least one physical resource block indicated by a first permutation mapping between at least one logical resource block and said at least one physical resource block;

communicating between the first mobile unit and a second base station different than the first base station a second signal using said at least one physical resource block indicated by the first permutation mapping; and processing the first and second signals based on the first permutation mapping to extract data therefrom.

2. The method of claim 1, wherein the wireless communication system provides wireless connectivity for a second mobile unit communicating a third signal with one of the first or second base stations using a second permutation mapping different than the first permutation mapping.

3. The method of claim 2, wherein the first, second, and third signals are communicated using a plurality of frames, each having a plurality of subframes, and the first permutation mapping is applied during at least a first one of the subframes, and the second permutation mapping is applied during at least a second one of the subframes different than the first one.

4. The method of claim 2, wherein the first, second, and third signals are communicated using a plurality of subcarriers, and the first permutation mapping is applied to at least a first subset of the subcarriers, and the second permutation mapping is applied to at least a second subset of the subcarriers different than the first subset.

5. The method of claim 2, wherein the first, second, and third signals are communicated during a plurality of time blocks, and the first permutation mapping is applied during at least a first one of the time blocks, and the second permutation mapping is applied during at least a second one of the time blocks different than the first one.

6. The method of claim 2, wherein the first, second, and third signals are communicated during a plurality of time blocks using a plurality of frequency blocks, and the first permutation mapping is applied during at least a first time and frequency block combination, and the second permutation mapping is applied during at least a second time and frequency block combination different than the first time and frequency block combination.

7. The method of claim 1, further comprising communicating changes to the first permutation mapping to the first and second base stations and the mobile unit from a central controller in the wireless communication system.

8. The method of claim 1, wherein the first and second signals are communicated concurrently.

9. A method for implementation in a wireless communication system that includes a plurality of base stations for providing wireless connectivity to at least a first mobile unit, comprising:

communicating between the first mobile unit and a first base station a first signal processed using a first permutation mapping, wherein the first permutation mapping defines a mapping between logical resource blocks and physical resource blocks;

communicating between the first mobile unit and a second base station different than the first base station a second signal processed using the first permutation mapping; and processing the first and second signals based on the first permutation mapping to extract data therefrom, wherein the wireless communication system provides wireless connectivity for a second mobile unit communicating a third signal with one of the first or second base stations using a second permutation mapping different than the first permutation mapping, wherein the first permutation mapping is applied to a first subset of the logical resource blocks, and the second permutation mapping is applied to a second subset of the logical resource blocks different than the first subset.

10. A mobile unit operable to communicate a first signal with a first base station and a second signal with a second base station, comprising:

a scheduler operable to apply a multi-point permutation mapping between at least one logical resource block and at least one physical resource block for processing the first and second signals to extract data therefrom, wherein the first and second signals are communicated using said at least one physical resource block.

11. The mobile unit of claim 10, wherein the scheduler is operable to apply the multi-point permutation mapping to a first subset of the logical resource blocks.

12. The mobile unit of claim 10, wherein the first and second signals are communicated using a plurality of subcarriers, and the scheduler is operable to apply the multi-point permutation mapping to at least a first subset of the subcarriers.

13. The mobile unit of claim 10, wherein the first and second signals are communicated during a plurality of time blocks using a plurality of frequency blocks, and the scheduler is operable to apply the multi-point permutation mapping during at least a first time and frequency block combination.

14. The mobile unit of claim 10, wherein the first and second signals are communicated concurrently.

15. A mobile unit operable to communicate a first signal with a first base station and a second signal with a second base station, comprising:

a scheduler operable to apply a multi-point permutation mapping for processing the first and second signals to extract data therefrom, wherein the first and second signals are communicated using a plurality of frames, each having a plurality of subframes, and the scheduler is operable to apply the multi-point permutation mapping during at least a first one of the subframes.

16. A wireless communication system, comprising:

at least a first mobile unit;

a first base station operable to communicate a first signal with the first mobile unit;

a second base station operable to communicate a second signal with the first mobile unit; and a controller operable to communicate a first permutation mapping between at least one logical resource block and at least one physical resource block to the mobile unit and the first and second base stations, wherein the first and second signals are communicated using at least one physical resource block, and wherein the first and second signals are processed using the first permutation mapping to extract data therefrom.

17. The system of claim 16, further comprising a second mobile unit operable to communicate a third signal with one of the first or second base stations using a second permutation mapping different than the first permutation mapping.

18. The system of claim 17, wherein the first, second, and third signals are communicated using a plurality of frames, each having a plurality of subframes, and the first permutation mapping is applied during at least a first one of the subframes, and the second permutation mapping is applied during at least a second one of the subframes different than the first one.

19. The system of claim 17, wherein the first, second, and third signals are communicated using a plurality of subcarriers, and the first permutation mapping is applied to at least a first subset of the subcarriers, and the second permutation mapping is applied to at least a second subset of the subcarriers different than the first subset.

20. The system of claim 17, wherein the first, second, and third signals are communicated during a plurality of time blocks, and the first permutation mapping is applied during at least a first one of the time blocks, and the second permutation mapping is applied during at least a second one of the time blocks different than the first one.

21. The system of claim 17, wherein the first, second, and third signals are communicated during a plurality of time blocks using a plurality of frequency blocks, and the first permutation mapping is applied during at least a first time and frequency block combination, and the second permutation mapping is applied during at least a second time and frequency block combination different than the first time and frequency block combination.

22. The system of claim 16, wherein the controller is operable to communicate changes to the first permutation mapping to the first and second base stations and the first mobile unit.

23. The mobile unit of claim 16, wherein the first and second signals are communicated concurrently.

24. A wireless communication system, comprising:
- at least a first mobile unit;
- a first base station operable to communicate a first signal with the first mobile unit;
- a second base station operable to communicate a second signal with the first mobile unit; and
- a controller operable to communicate a first permutation mapping to the mobile unit and the first and second base stations, wherein the first and second signals are processed using the first permutation mapping to extract data therefrom, wherein the first permutation mapping defines a mapping between logical resource blocks and physical resource blocks, and wherein the first permutation mapping is applied to a first subset of the logical resource blocks, and the second permutation mapping is applied to a second subset of the logical resource blocks different than the first subset.

* * * * *